United States Patent
Kupratis et al.

(10) Patent No.: US 10,100,731 B2
(45) Date of Patent: Oct. 16, 2018

(54) TURBINE ENGINE WITH A TURBO-COMPRESSOR

(71) Applicant: United Technologies Corporation, Hartford, CT (US)

(72) Inventors: Daniel B. Kupratis, Wallingford, CT (US); William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 620 days.

(21) Appl. No.: 14/622,383

(22) Filed: Feb. 13, 2015

(65) Prior Publication Data

US 2016/0356218 A1    Dec. 8, 2016

(51) Int. Cl.

| | | |
|---|---|---|
| F02C 3/10 | (2006.01) | |
| F02C 6/12 | (2006.01) | |
| F01D 1/12 | (2006.01) | |
| F02C 3/045 | (2006.01) | |
| F02C 3/073 | (2006.01) | |
| F02C 3/14 | (2006.01) | |
| F01D 5/12 | (2006.01) | |
| F01D 9/04 | (2006.01) | |
| F02C 3/04 | (2006.01) | |
| F02C 7/36 | (2006.01) | |

(Continued)

(52) U.S. Cl.
CPC ............... *F02C 6/12* (2013.01); *F01D 1/12* (2013.01); *F01D 5/12* (2013.01); *F01D 9/041* (2013.01); *F02C 3/04* (2013.01); *F02C 3/045* (2013.01); *F02C 3/073* (2013.01); *F02C 3/14* (2013.01); *F02C 7/36* (2013.01); *F04D 29/324* (2013.01); *F04D 29/542* (2013.01); *F05D 2220/32* (2013.01); *F05D 2240/35* (2013.01)

(58) Field of Classification Search
USPC .......... 60/792, 39.162, 39.163, 39.16, 39.17, 60/268, 330, 340
See application file for complete search history.

(56) References Cited

U.S. PATENT DOCUMENTS

| | | |
|---|---|---|
| 2,391,779 A | 12/1945 | Griffith |
| 2,548,975 A | 4/1951 | Hawthorne |

(Continued)

FOREIGN PATENT DOCUMENTS

| | | |
|---|---|---|
| DE | 1190736 | 4/1965 |
| GB | 585345 | 2/1947 |
| GB | 586554 | 3/1947 |

OTHER PUBLICATIONS

Extended EP Search Report dated Jul. 14, 2016.
(Continued)

*Primary Examiner* — Binh Q Tran
(74) *Attorney, Agent, or Firm* — O'Shea Getz P.C.

(57) ABSTRACT

A turbine engine is provided that includes a first rotor, a second rotor and a combustor section. The first rotor includes a first set of compressor blades. The second rotor is adjacent the first rotor. The second rotor includes a second set of compressor blades and a set of turbine blades respectively connected to the second set of compressor blades. The combustor section is configured to receive air compressed by the first and the second sets of compressor blades. The combustor section is also configured to provide combustion products to the set of turbine blades.

20 Claims, 16 Drawing Sheets

(51) Int. Cl.
*F04D 29/32* (2006.01)
*F04D 29/54* (2006.01)

(56) References Cited

U.S. PATENT DOCUMENTS

| | | | |
|---|---|---|---|
| 3,280,561 A | 10/1966 | Kutney | |
| 3,448,582 A * | 6/1969 | Bracey | F02K 3/04 |
| | | | 415/91 |
| 3,524,318 A * | 8/1970 | Bouiller | F02C 3/067 |
| | | | 415/60 |
| 3,818,695 A | 6/1974 | Rylewski | |
| 4,216,923 A | 8/1980 | Harris | |
| 4,251,987 A | 2/1981 | Adamson | |
| 4,392,809 A | 7/1983 | Tieberg et al. | |
| 4,462,207 A | 7/1984 | Hitchcock | |
| 4,506,502 A | 3/1985 | Shapiro | |
| 5,832,715 A | 11/1998 | Dev | |
| 5,852,928 A | 12/1998 | Vauchel | |
| 6,430,917 B1 | 8/2002 | Platts | |
| 6,464,453 B2 * | 10/2002 | Toborg | F01D 5/081 |
| | | | 415/115 |
| 6,939,392 B2 | 9/2005 | Huang et al. | |
| 8,176,725 B2 | 5/2012 | Norris et al. | |
| 8,607,576 B1 * | 12/2013 | Christians | F02C 7/36 |
| | | | 60/792 |
| 8,915,700 B2 * | 12/2014 | Kupratis | F02C 7/36 |
| | | | 415/122.1 |
| 2008/0141650 A1 * | 6/2008 | Johnson | F01D 17/162 |
| | | | 60/39.162 |
| 2010/0037623 A1 | 2/2010 | Jewess et al. | |
| 2010/0077724 A1 | 4/2010 | Migliaro, Jr. | |
| 2011/0056208 A1 | 3/2011 | Norris et al. | |
| 2012/0110978 A1 | 5/2012 | Paul | |
| 2012/0137651 A1 | 6/2012 | Taguchi et al. | |
| 2012/0272656 A1 | 11/2012 | Norris | |
| 2014/0165588 A1 | 6/2014 | Snape et al. | |
| 2014/0250862 A1 | 9/2014 | Suciu et al. | |
| 2014/0250863 A1 | 9/2014 | Suciu et al. | |
| 2014/0252160 A1 | 9/2014 | Suciu et al. | |
| 2014/0252167 A1 | 9/2014 | Suciu et al. | |

OTHER PUBLICATIONS

Extended EP Search Report dated Jul. 12, 2016.
Extended EP Search Report dated Jun. 15, 2016.
EP office action for EP16155711.1 dated Oct. 24, 2017.
Office action for U.S. Appl. No. 14/622,523 dated May 5, 2017.
Office action for U.S. Appl. No. 14/622,485 dated Mar. 9, 2017.
Office action for U.S. Appl. No. 14/622,523 dated Aug. 25, 2017.

* cited by examiner

TURBINE ENGINE WITH A TURBO-COMPRESSOR

BACKGROUND OF THE INVENTION

1. Technical Field

This disclosure relates generally to a turbine engine and, more particularly, to a turbine engine with a turbo-compressor.

2. Background Information

Various types of turbine engines for propelling an aircraft are known in the art. Examples of such turbine engines include an axial flow turbofan engine and a reverse flow turbofan engine. A typical axial flow turbofan engine includes a fan section, a compressor section, a combustor section and a turbine section, which are arranged sequentially along an axial centerline. A typical reverse flow turbofan engine, in contrast to an axial flow turbofan engine, includes a turbo-compressor which incorporates its compressor section and its turbine section together. A core flow path within such a turbine engine, therefore, reverses direction in order to fluidly couple the compressor section with the turbine section. While each of the foregoing turbine engine types have various advantages, there is still a need in the art for improvement.

SUMMARY OF THE DISCLOSURE

According to an aspect of the disclosed invention, a turbine engine is provided that includes a first rotor, a second rotor and a combustor section. A first rotor includes a first set of compressor blades. A second rotor is adjacent the first rotor. The second rotor includes a second set of compressor blades and a set of turbine blades respectively connected to the second set of compressor blades. The combustor section is configured to receive air compressed by the first and the second sets of compressor blades. The combustor section is also configured to provide combustion products to the set of turbine blades.

According to an aspect of the disclosed invention, a turbine engine is provided that includes a first compressor section, a turbo-compressor and a combustor section. The turbo-compressor includes a second compressor section and a turbine section. The second compressor section is downstream of the first compressor section. The combustor section is fluidly coupled between the second compressor section and the turbine section.

The first compressor section may include a first rotor. The second compressor section may include a second rotor which is discrete from the first rotor.

The first compressor section may include a first set of compressor blades which respectively extend to blades tips. The second compressor section may include a second set of compressor blades. The turbine section may include a set of turbine blades radially outboard of and respectively connected to the second set of compressor blades.

The first rotor may include a second set of turbine blades respectively connected to the first set of compressor blades.

The second set of turbine blades may be downstream of the set of turbine blades.

The first set of compressor blades may respectively extend to blade tips.

A set of shrouds may be included and may be respectively positioned between the second set of compressor blades and the set of turbine blades.

The first rotor may include a third set of compressor blades between the set of compressor blades and the second set of compressor blades.

The third set of compressor blades may respectively extend to blade tips.

The first rotor may include a second set of turbine blades downstream of the set of turbine blades and respectively connected to the third set of compressor blades.

The second rotor may include a third set of compressor blades.

The third set of compressor blades may respectively extend to blade tips.

The second rotor may include a second set of turbine blades respectively connected to the third set of compressor blades.

A third rotor may be included and between the second set of compressor blades and the combustor section. The third rotor may include a third set of compressor blades.

A third rotor may be included and between the combustor section and the set of turbine blades. The third rotor may include a second set of turbine blades.

A fan section may be included and upstream of the first rotor.

A rotor of the fan section may be connected to the first rotor.

A rotor of the fan section may be connected to the second rotor.

A rotor of the fan section may be connected to the first rotor and/or the second rotor through a gear train.

The foregoing features and the operation of the invention will become more apparent in light of the following description and the accompanying drawings.

DETAILED DESCRIPTION OF THE INVENTION

Figure 1:
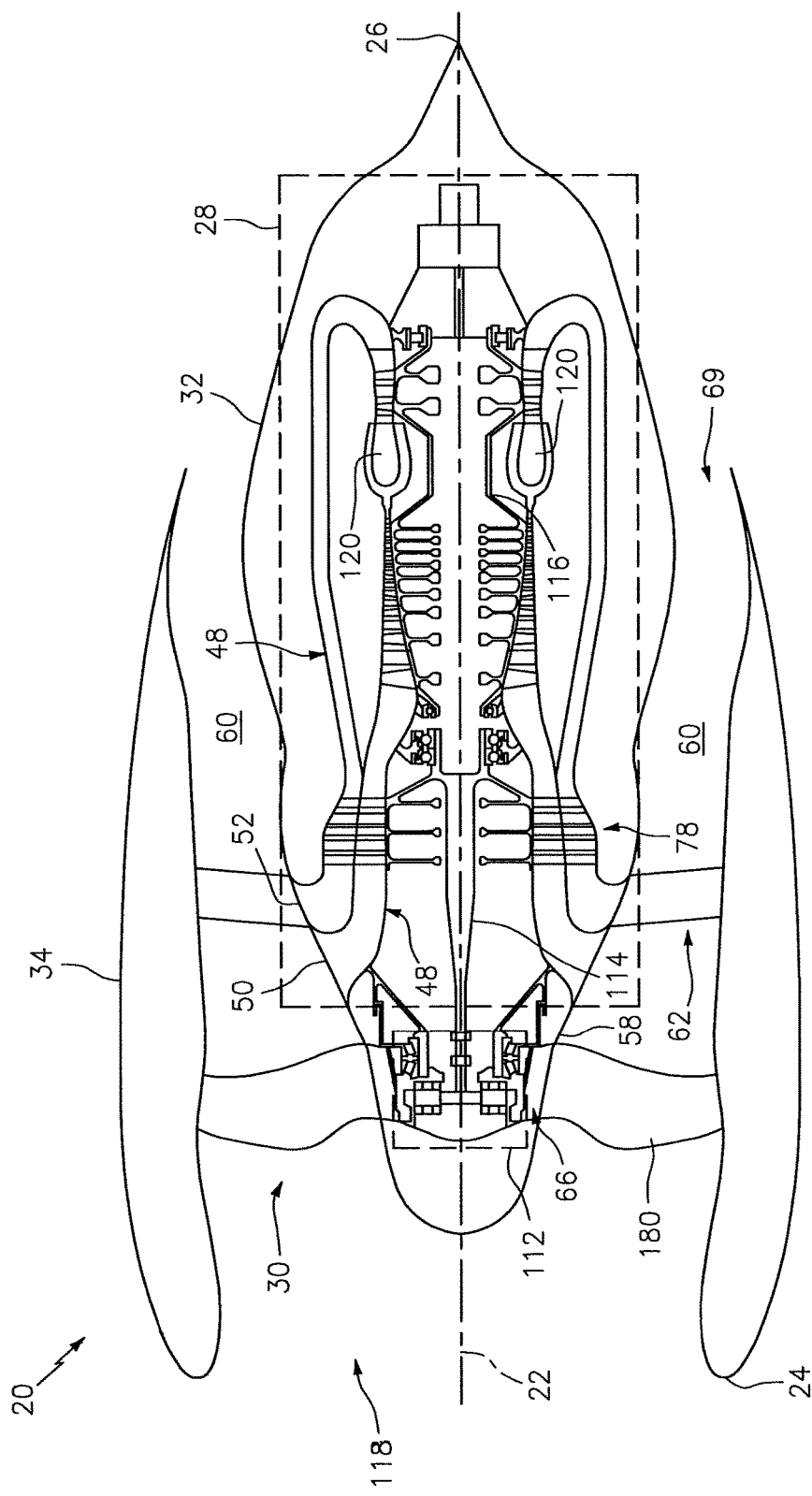
FIG. 1 is a schematic sectional illustration of a geared turbofan turbine engine.

FIG. 1 is a schematic sectional illustration of a geared turbofan turbine engine 20. This turbine engine 20 extends along an axial centerline 22 between a forward, upstream end 24 and an aft, downstream end 26. The turbine engine 20 includes a turbine engine core 28 and a fan section 30. The turbine engine core 28 is housed within an inner core nacelle 32. The fan section 30 is housed within an outer fan nacelle 34, which axially overlaps a forward, upstream portion of the core nacelle 32.

Figure 2:
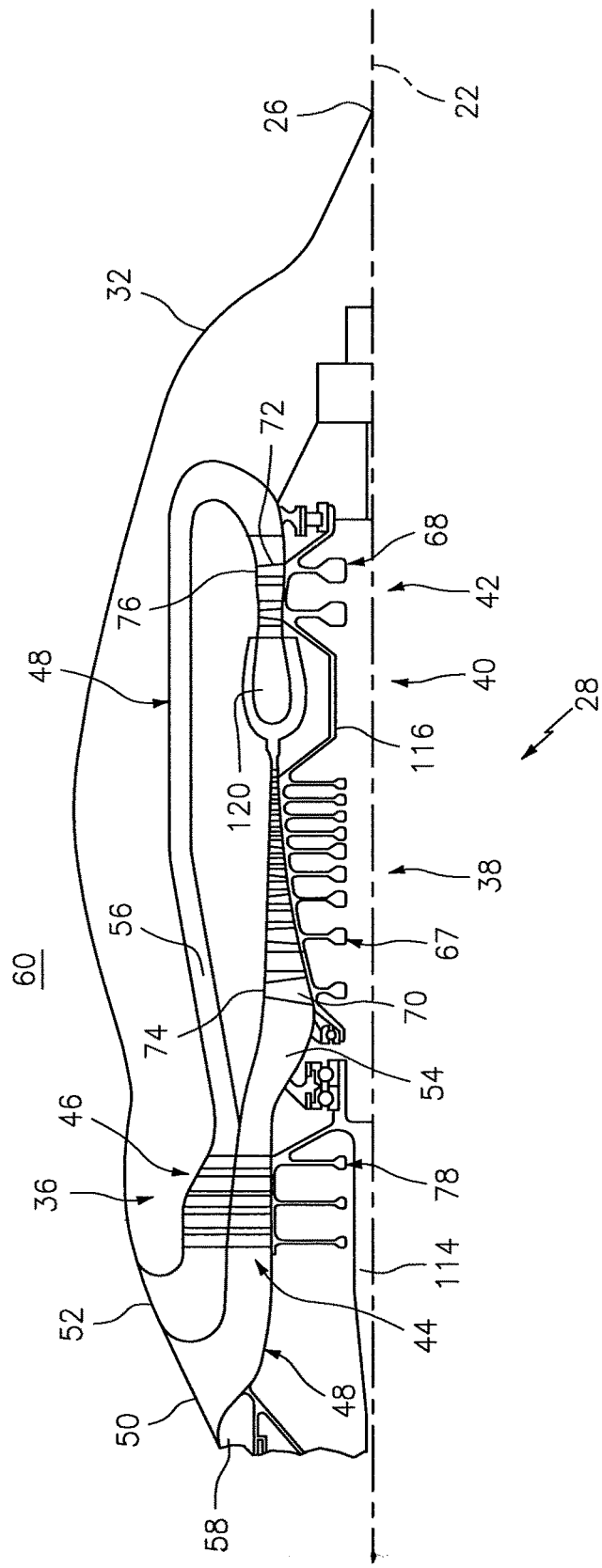
FIG. 2 is a partial, schematic sectional illustration of a core of the turbine engine of FIG. 1.

Referring to FIG. 2, the turbine engine core 28 includes a turbo-compressor 36, a high pressure compressor (HPC) section 38, a combustor section 40 and a high pressure turbine (HPT) section 42. The turbo-compressor 36 includes a low pressure compressor (LPC) section 44 and a low pressure turbine (LPT) section 46.

A core flow path 48 extends sequentially through the engine sections 44, 38, 40, 42 and 46 between an upstream core inlet 50 and a downstream core outlet 52. The core flow path 48 of FIG. 2, for example, includes an annular forward flow section 54 and an annular reverse flow section 56. The forward flow section 54 extends aftward along the centerline 22 from the core inlet 50 and sequentially fluidly couples the engine sections 44, 38, 40 and 42. The reverse flow section 56 extends forward around the centerline 22 towards the core outlet 52 and fluidly couples the high pressure turbine section 42 with the low pressure turbine section 46. The core outlet 52 may be arranged adjacent and downstream of the core inlet 50. The core inlet 50 and the core outlet 52 of FIG. 2, for example, are disposed at (e.g., on, adjacent or proximate) a forward, upstream end 58 of the core nacelle 32.

Referring to FIG. 1, a bypass flow path 60 is formed radially between the core nacelle 32 and the fan nacelle 34. This bypass flow path 60 extends aftward around the centerline 22 between an upstream bypass inlet 62 and a downstream bypass exhaust 64. The bypass inlet 62 may be located downstream of the core inlet 50 but upstream of the core outlet 52. The bypass inlet 62 of FIG. 1, for example, is disposed at an interface between the core inlet 50 and the core outlet 52. An outer portion of the bypass exhaust 64 is formed by a nozzle at an aft, downstream end of the fan nacelle 34. This nozzle may be a fixed nozzle or a variable area nozzle. An inner portion of the bypass exhaust 64 is formed by a corresponding portion of the core nacelle 32.

Referring to FIGS. 1 and 2, each of the engine sections 30, 38 and 42 includes a respective rotor 66-68. Each of these rotors 66-68 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). Each of these rotor blades may extend radially out to a distal end blade tip or shroud. The compressor blades 70 and the turbine blades 72 of FIG. 2, for example, each extend to a respective blade tip 74, 76.

Figure 3:
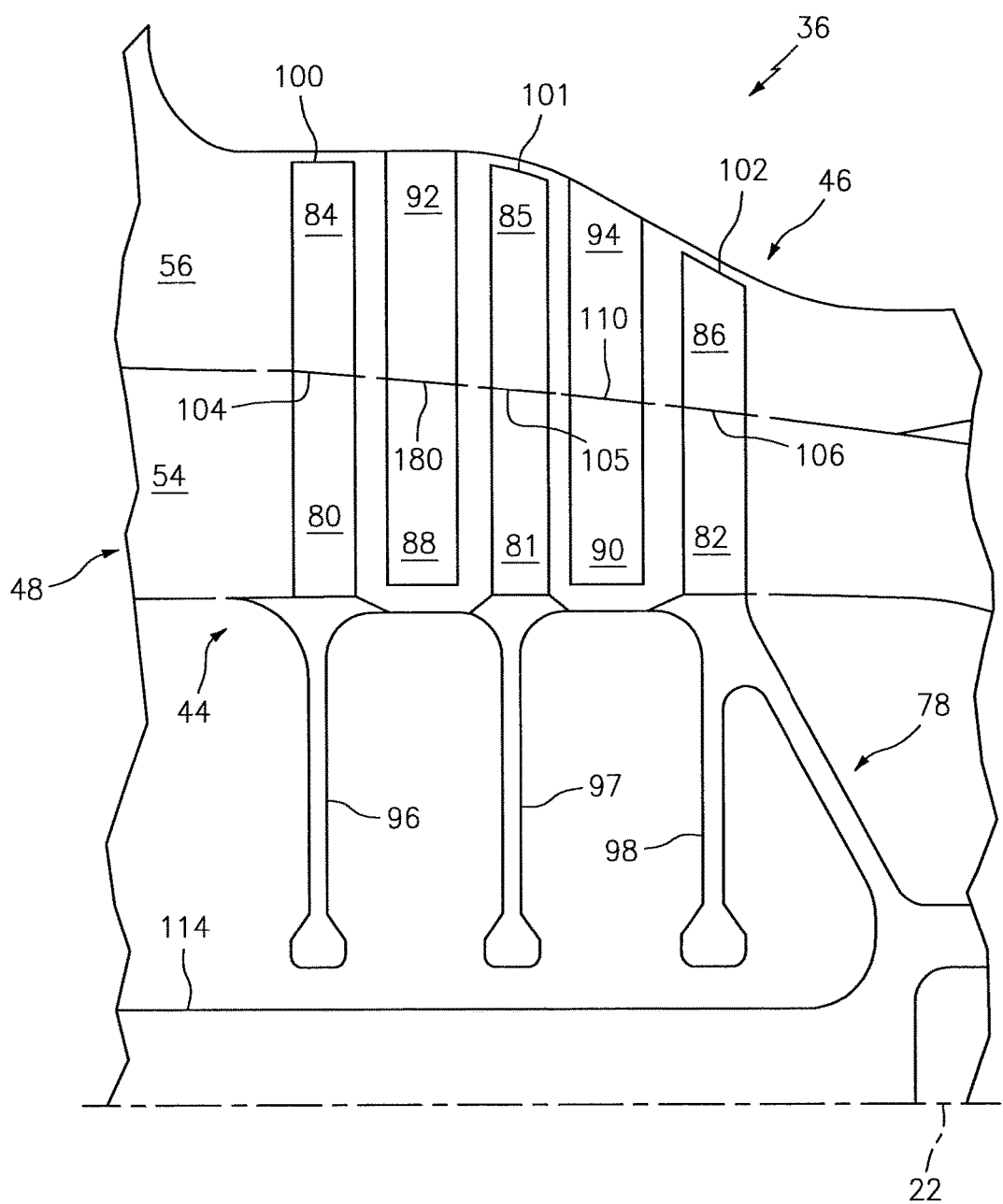
FIG. 3 is a partial, schematic sectional illustration of an example of a turbo-compressor.
Figure 4A:
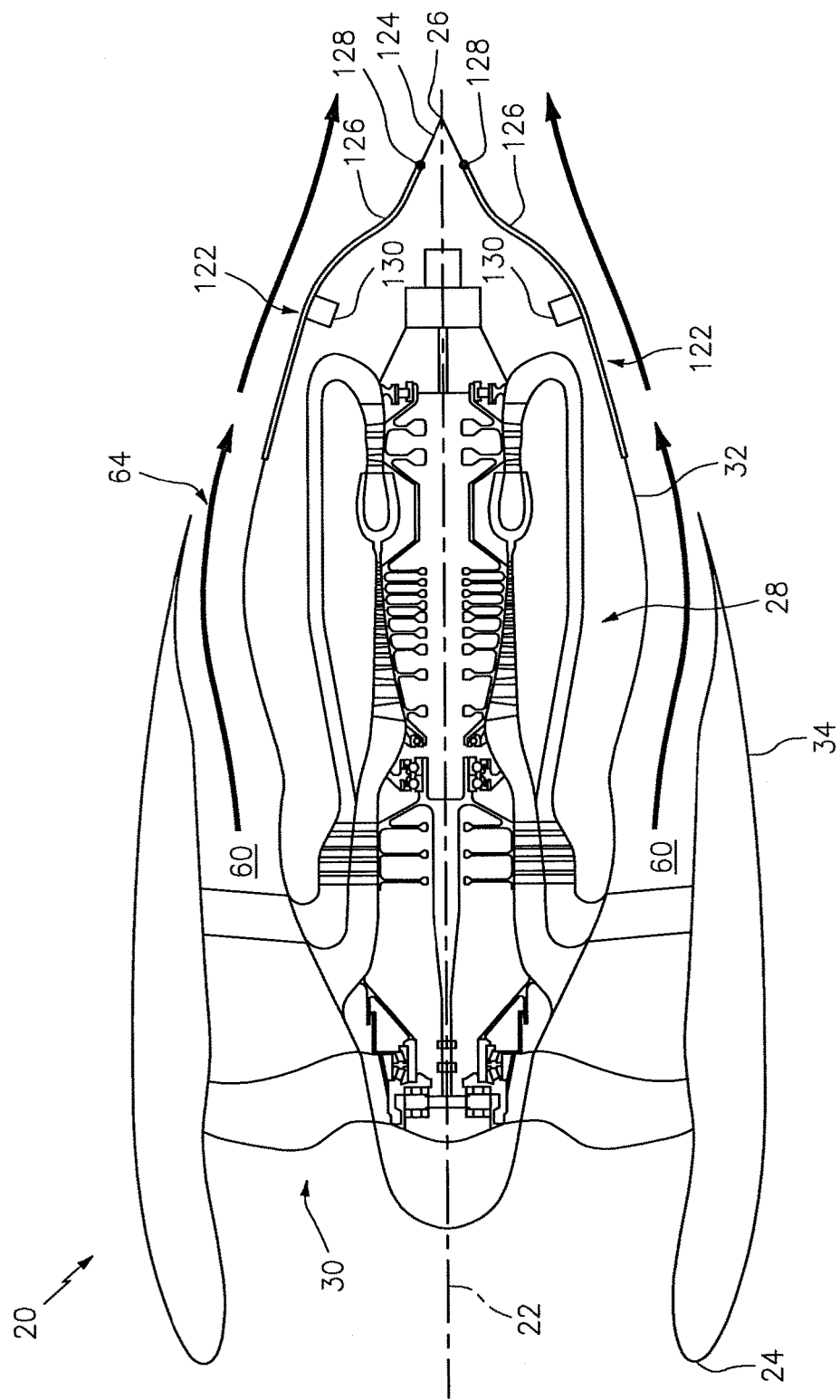
FIG. 4A is a schematic sectional illustration of a geared turbofan turbine engine with an example of a clamshell thrust reverser in a stowed position.
Figure 4B:
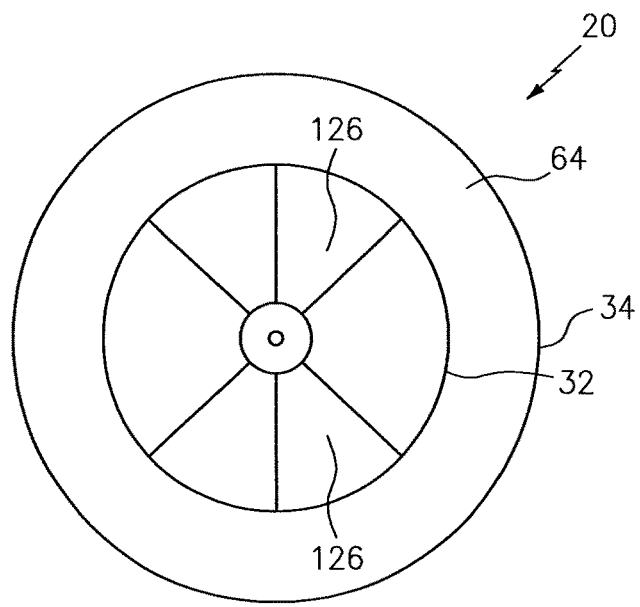
FIG. 4B is a schematic rear view illustration of the turbine engine of FIG. 4A with the clamshell thrust reverser in the stowed position.
Figure 5B:
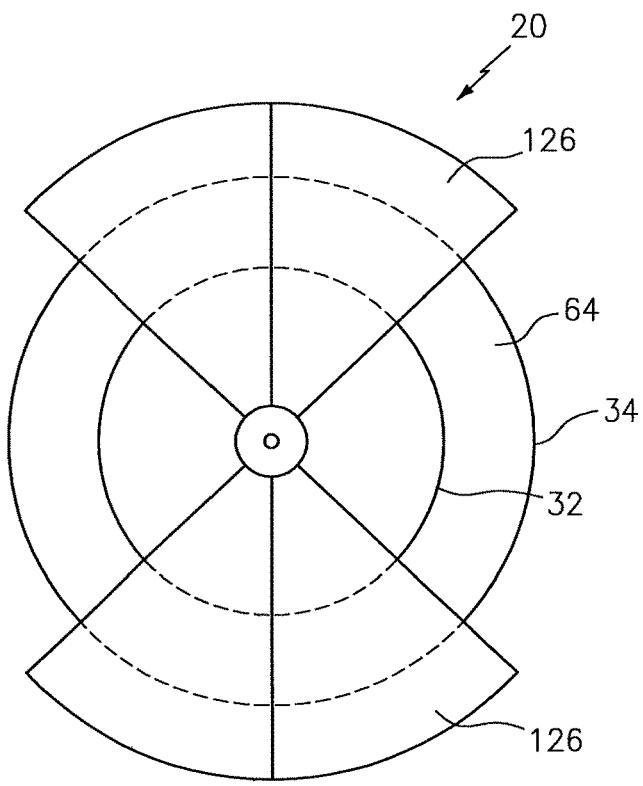
FIG. 5B is a schematic rear view illustration of the turbine engine of FIG. 5A with the clamshell thrust reverser in the deployed position.
Figure 5A:
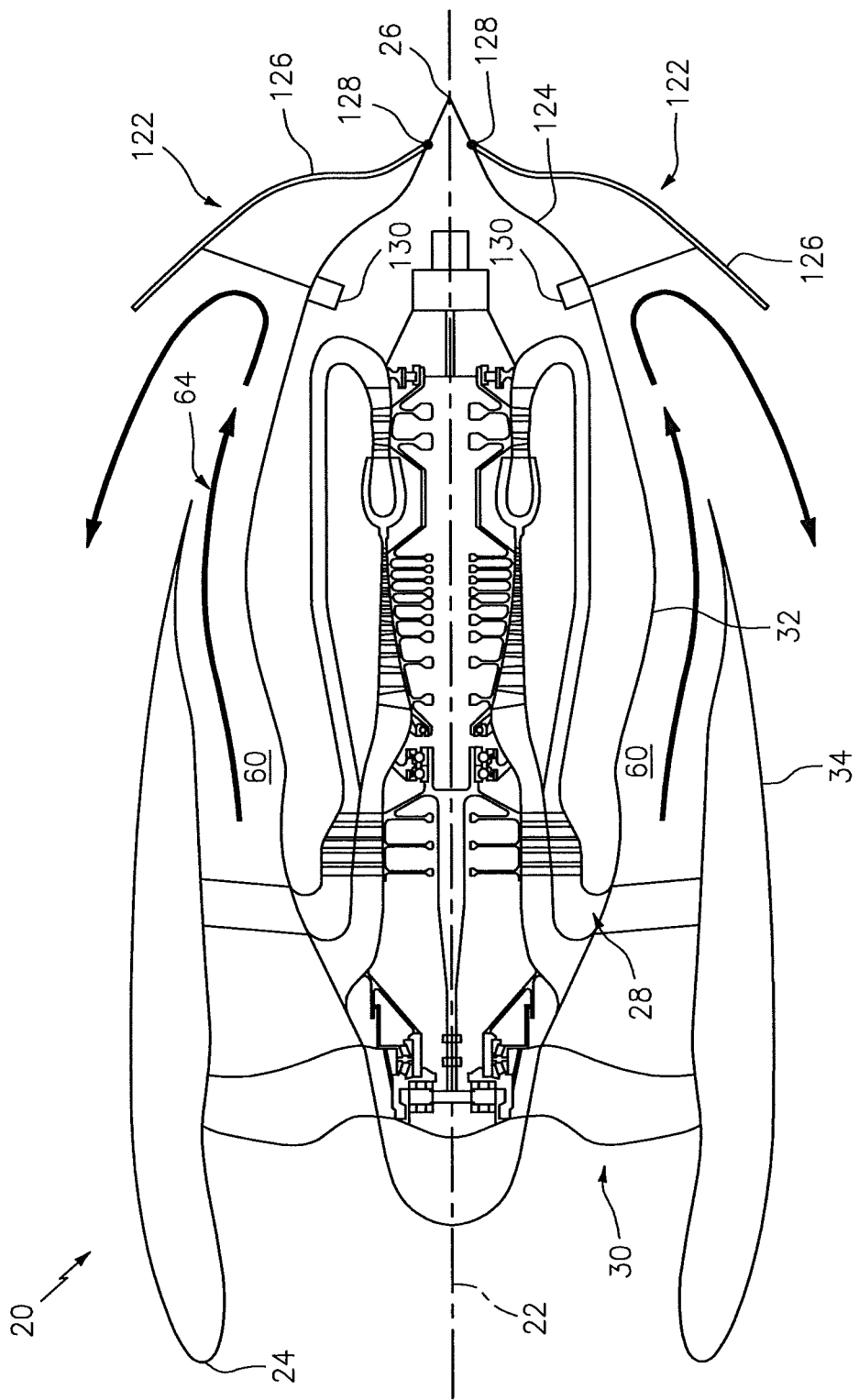
FIG. 5A is a schematic sectional illustration of the turbine engine of FIG. 4A with the clamshell thrust reverser in a deployed position.

Referring to FIG. 3, the turbo-compressor 36 includes a rotor 78 configured for both the low pressure compressor section 44 and the low pressure turbine section 46. This turbo-compressor rotor 78 includes one or more sets of compressor blades 80-82 and one or more set of turbine blades 84-86. Adjacent sets of the compressor blades (e.g., 80 and 81, 81 and 82) may be separated by a respective set of stator vanes 88 and 90. Each set of the compressor blades 80-82 therefore may form a respective stage of the low pressure compressor section 44. Similarly, adjacent sets of the turbine blades (e.g., 84 and 85, 85 and 86) may be separated by a respective set of stator vanes 92 and 94. Each set of the turbine blades 84-86 therefore may form a respective stage of the low pressure turbine section 46.

The compressor blades 80-82 are arranged circumferentially around and connected to one or more respective rotor disks 96-98. The turbine blades 84-86 are arranged radially outboard of the compressor blades 80-82. Each turbine blades 84-86 is connected to a respective one of the compressor blades 80-82. Thus, each of the turbine blades 84-86—not the compressor blades 80-82 illustrated in FIG. 3—extends radially out to a distal end blade tip 100-102. Each respective pair of compressor and turbine blades (e.g., 80 and 84, 81 and 85, 82 and 86) may be separated by a respective shroud 104-106. Similarly, each respective pair of stator vanes (e.g., 88 and 92, 90 and 94) may be separated by a respective shroud 108, 110. The shrouds 104-106, 108 and 110 form a barrier wall between the low pressure compressor section 44 and the low pressure turbine section 46 as well as between the forward flow section 54 and the reverse flow section 56.

A set of stator vanes 89 (e.g., inlet guide vanes) may be arranged next to and upstream of the turbo-compressor rotor 78 and the LPC section 44. A set of stator vanes 91 (e.g., exit guide vanes) may be arranged next to and downstream of the turbo-compressor rotor 78 and the LPC section 44. A set of stator vanes 93 (e.g., nozzle vanes) may be arranged next to and upstream of the turbo-compressor rotor 78 and the LPT section 46. A set of stator vanes 95 (e.g., exit guide vanes) may be arranged next to and downstream of the turbo-compressor rotor 78 and the LPT section 46.

Referring again to FIG. 1, the fan rotor 66 is connected to a gear train 112. The gear train 112 and, thus, the fan rotor 66 are connected to and driven by the turbo-compressor rotor 78 through a low speed shaft 114. Referring to FIG. 2, the high pressure compressor rotor 67 is connected to and driven by the high pressure turbine rotor 68 through a high speed shaft 116. The shafts 114 and 116 are rotatably supported by a plurality of bearings; e.g., rolling element and/or thrust bearings. Each of these bearings is connected to an engine casing by at least one stationary structure such as, for example, an annular support strut.

Referring now to FIGS. 1-3, during operation, air enters the turbine engine 20 through an airflow inlet 118. This entering air is directed through the fan section 30 and into the core flow path 48 and the bypass flow path 60. The air within the core flow path 48 may be referred to as "core air". The air within the bypass flow path 60 may be referred to as "bypass air".

The core air is compressed by the compressor sections 44 and 38 and directed to the combustor section 40. Within the combustor section 40, fuel is injected into a combustion chamber 120 and mixed with the compressed core air. This fuel-core air mixture is ignited and produces relatively hot combustion products, which now makes up a majority or all of the core air. These combustion products (post combustion core air) expand and interact with the turbine blades (e.g., see FIGS. 2 and 3, elements 72 and 86-84) causing the rotors 68 and 78 to rotate and thereby power the turbine engine 20. The expanded combustion products are thereafter exhausted into the bypass flow path 60 through the core outlet 52.

Within the bypass flow path 60, the bypass air mixes with the exhausted combustion products. This bypass air/combustion products mixture flows through the bypass flow path 60 and out of the turbine engine 20 through the bypass exhaust 64 to provide forward engine thrust. Alternatively, some or all of the bypass air/combustion products mixture may be redirected by a thrust reverser to provide reverse thrust.

FIGS. 4A to 5B illustrate an exemplary thrust reverser 122 for the turbine engine 20. This thrust reverser 122 is configured as a clamshell thrust reverser. The core nacelle 32, for example, includes a nacelle structure 124 (e.g., stationary cowling) and one or more thrust reverser panels 126. The panels 126 are disposed circumferentially about the core nacelle 32 and the centerline 22. The panels 126 of FIGS. 4 and 5, for example, are arranged on opposing gravitational top and bottom portions of the nacelle structure 124. One or more of the panels 126, however, may also or alternatively be arranged on opposing gravitational side portions of the nacelle structure 124.

An aft, inner end 128 of each panel 126 is pivotally connected to the nacelle structure 124. Each panel 126 is also coupled with an actuator 130 (schematically shown). This actuator 130 moves (e.g., pivots) the respective panel 126 between a stowed position (see FIGS. 4A and 4B) and a deployed position (see FIGS. 5A and 5B). In the stowed portion, air exhausted from the bypass flow path 60 may flow aftward and over the panels 126 to provide forward engine thrust. In the deployed position, air exhausted from the bypass flow path 60 is obstructed and redirected by the panels 126 outboard of the fan nacelle 34 and forward to provide reverse engine thrust.

Figure 6:
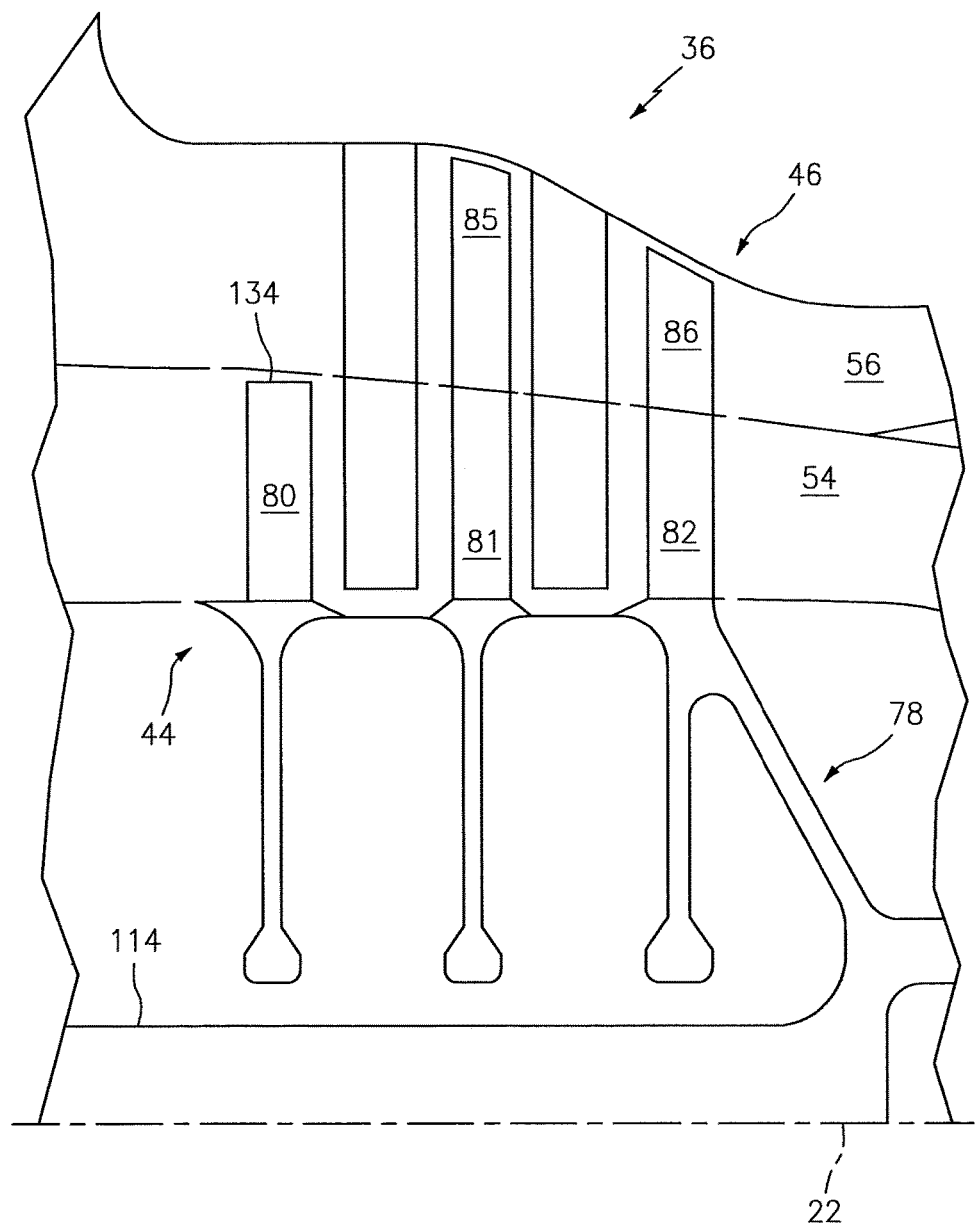
FIGS. 6-8 are partial, schematic sectional illustrations of alternate turbo-compressors.
Figure 7:
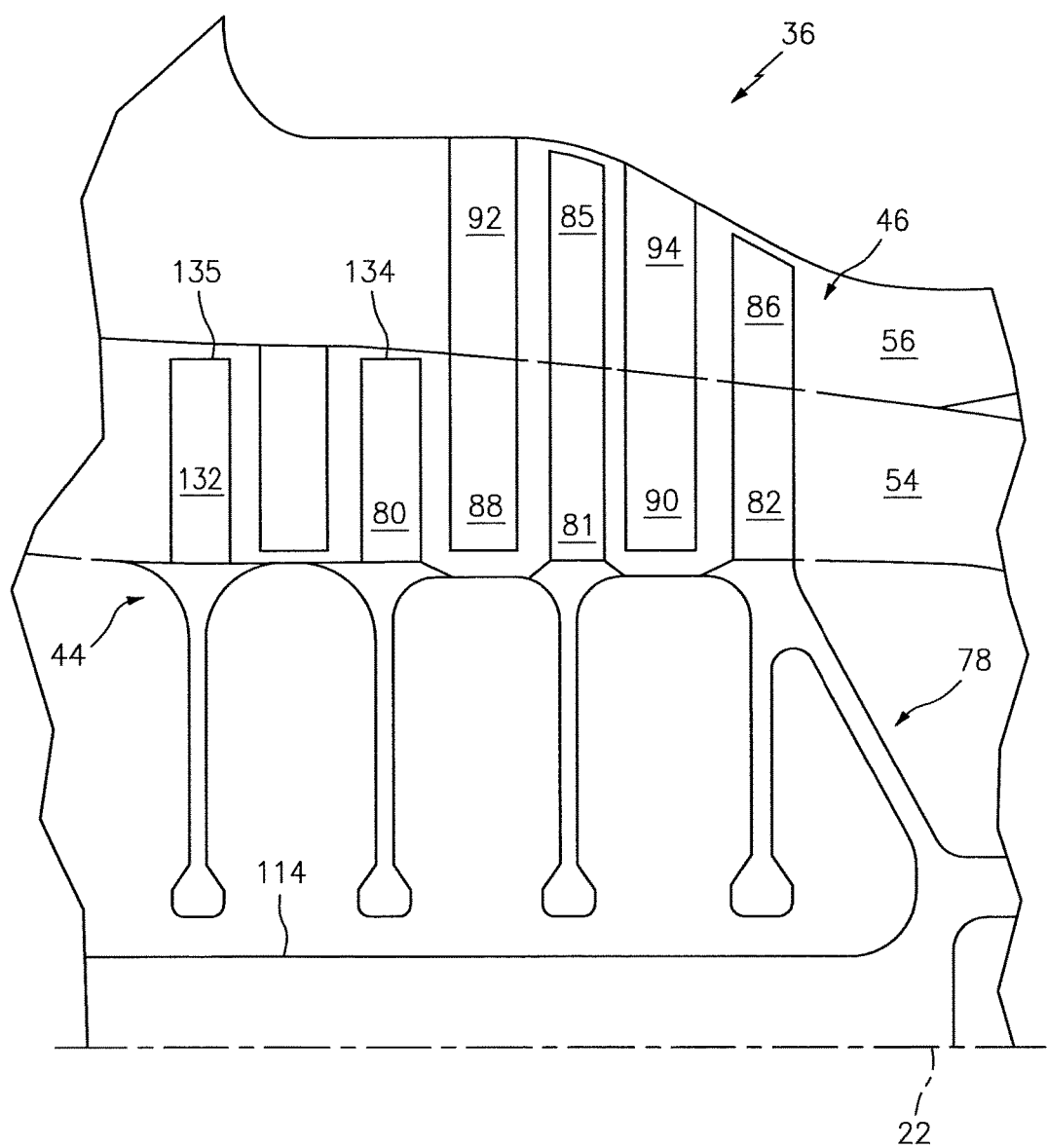
Figure 8:
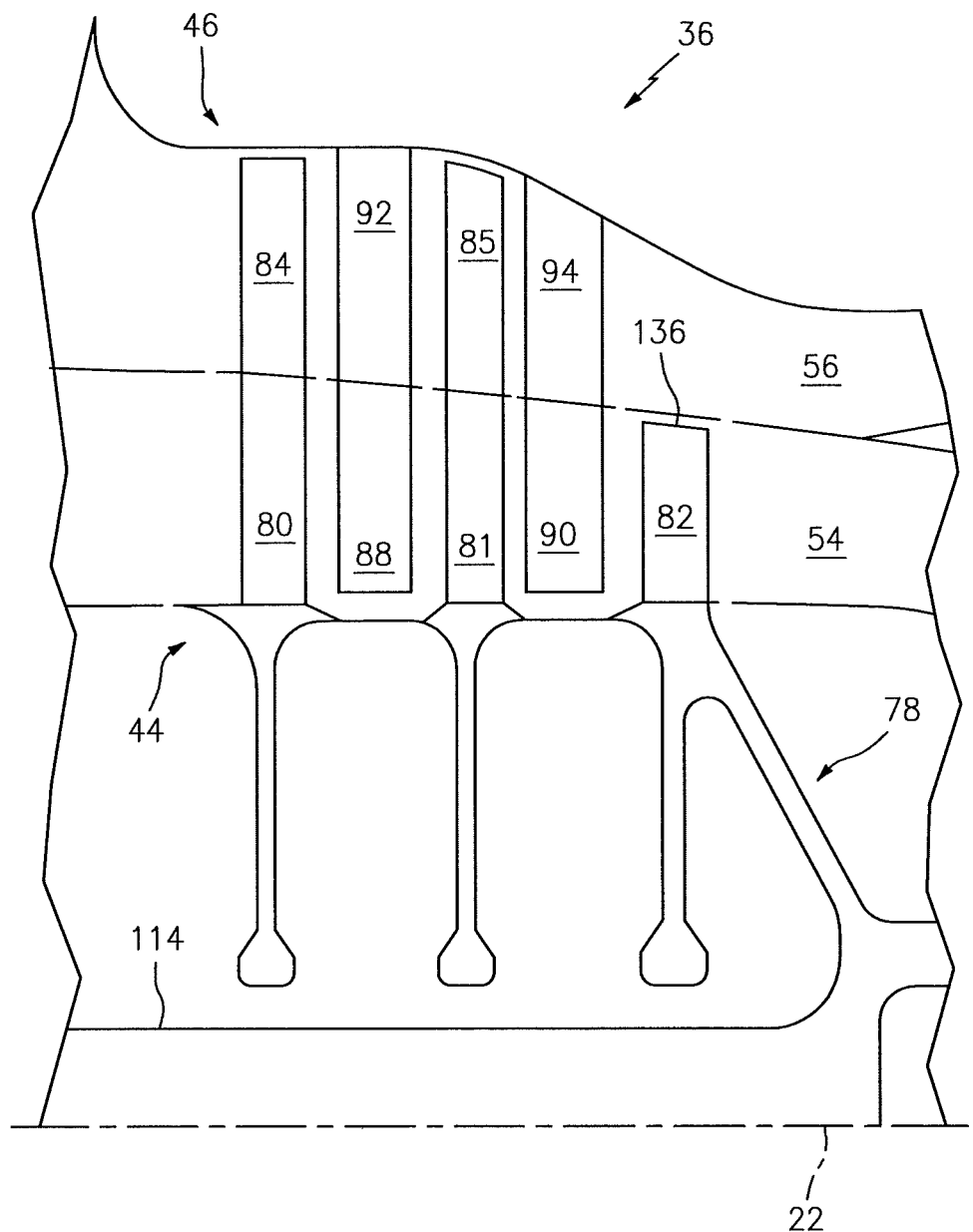

Referring to FIGS. 6-8, in some embodiments, the turbo-compressor 36 may be configured with a first number of compressor stages and a second number of turbine stages that is different than the first number. The turbo-compressor 36, for example, may be configured with one or more additional compressor stages than turbine stages. These compressor and turbine stages may be arranged in various configurations. The turbine blades 84 (see FIG. 3), for example, may be omitted as illustrated in FIGS. 6 and 7. The turbine blades 86 (see FIG. 3) may be omitted as illustrated in FIG. 8. In addition or alternatively, the turbo-compressor 36 may include at least one additional set of compressor blades 132. In such exemplary embodiments, the compressor blades 80, 81, 82 and 132 may respectively extend radially to distal blade tips 134-136. The turbo-compressor 36 of the present disclosure, of course, may have various configurations other than those described above and illustrated in the drawings. For example, in other embodiments, a discrete compressor stage may be arranged between a pair of compressor/turbine stages.

Figure 9:
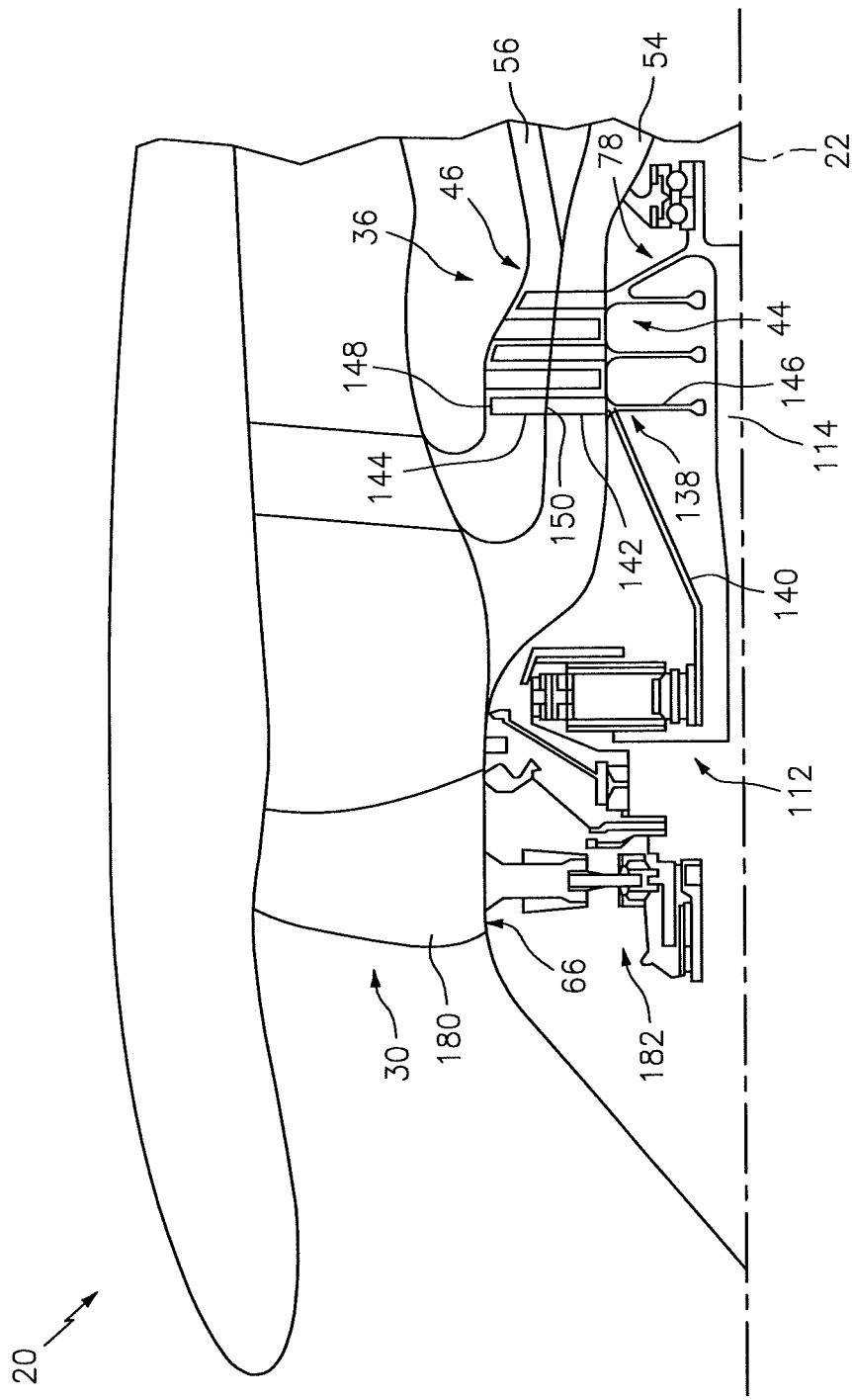
FIG. 9 is a partial, schematic sectional illustration of an alternate example of geared turbofan turbine engine with a pair of turbo-compressors.

Referring to FIG. 9, in some embodiments, the turbine engine 20 may include an additional rotor 138 forward of the turbo-compressor rotor 78. This rotor 138 may be connected to the gear train 112 through a shaft 140. The rotor 138 may be configured as an additional turbo-compressor rotor. The rotor 138 of FIG. 9, for example, includes at least one set of compressor blades 142 and at least one set of turbine blades 144.

The compressor blades 142 are arranged circumferentially around and connected to a respective rotor disk 146. The turbine blades 144 are arranged radially outboard of the compressor blades 142. Each turbine blade 144 is connected to a respective one of the compressor blades 142. Thus, each of the turbine blades 144 extends radially out to a distal end blade tip 148. Each respective pair of compressor and turbine blades 142 and 144 may be separated by a respective shroud 150. These shrouds 150 further form the barrier wall between the forward flow section 54 and the reverse flow section 56.

Figure 10:
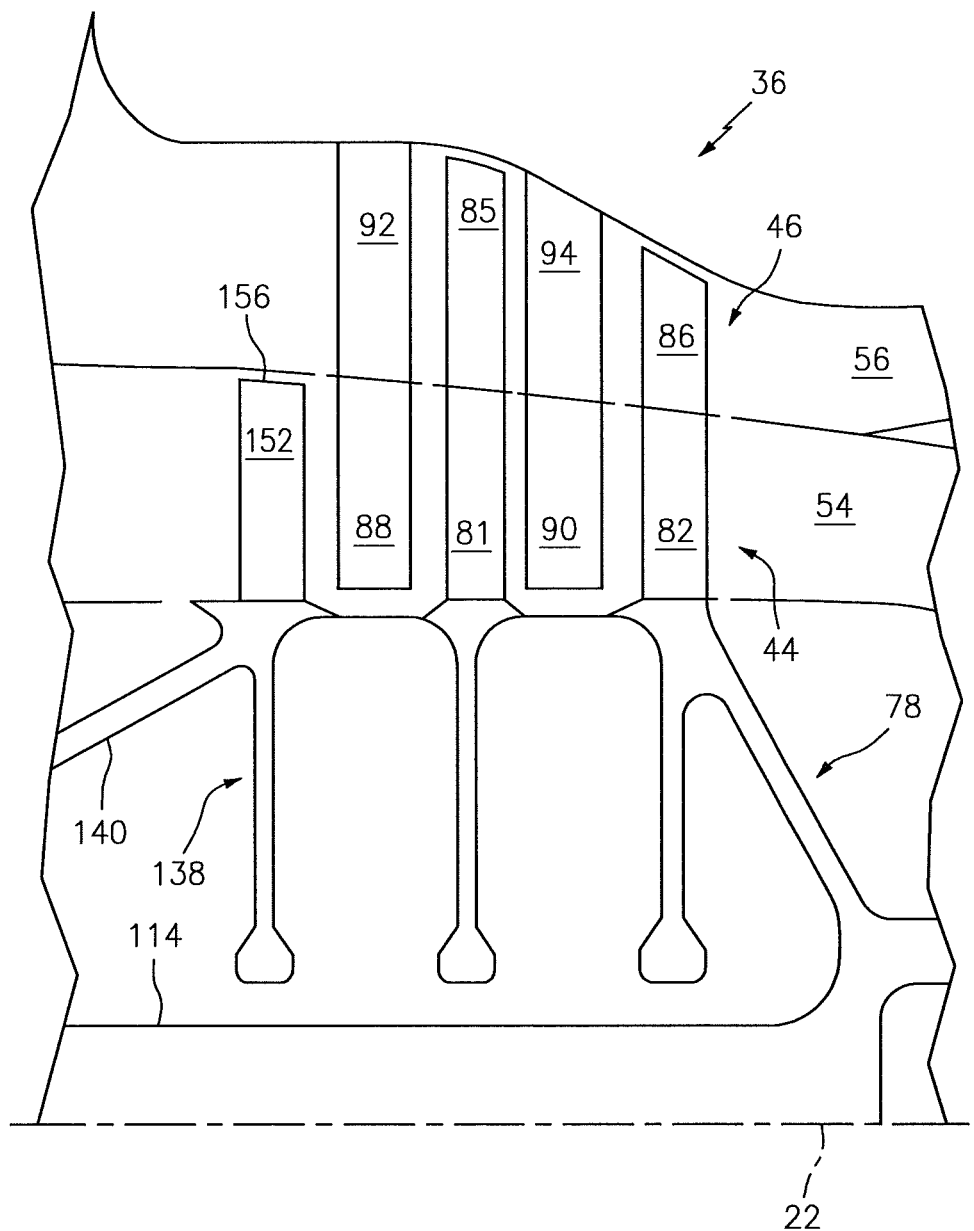
FIG. 10 is a partial, schematic sectional illustration of an example of a compressor section upstream of a turbo-compressor.
Figure 11:
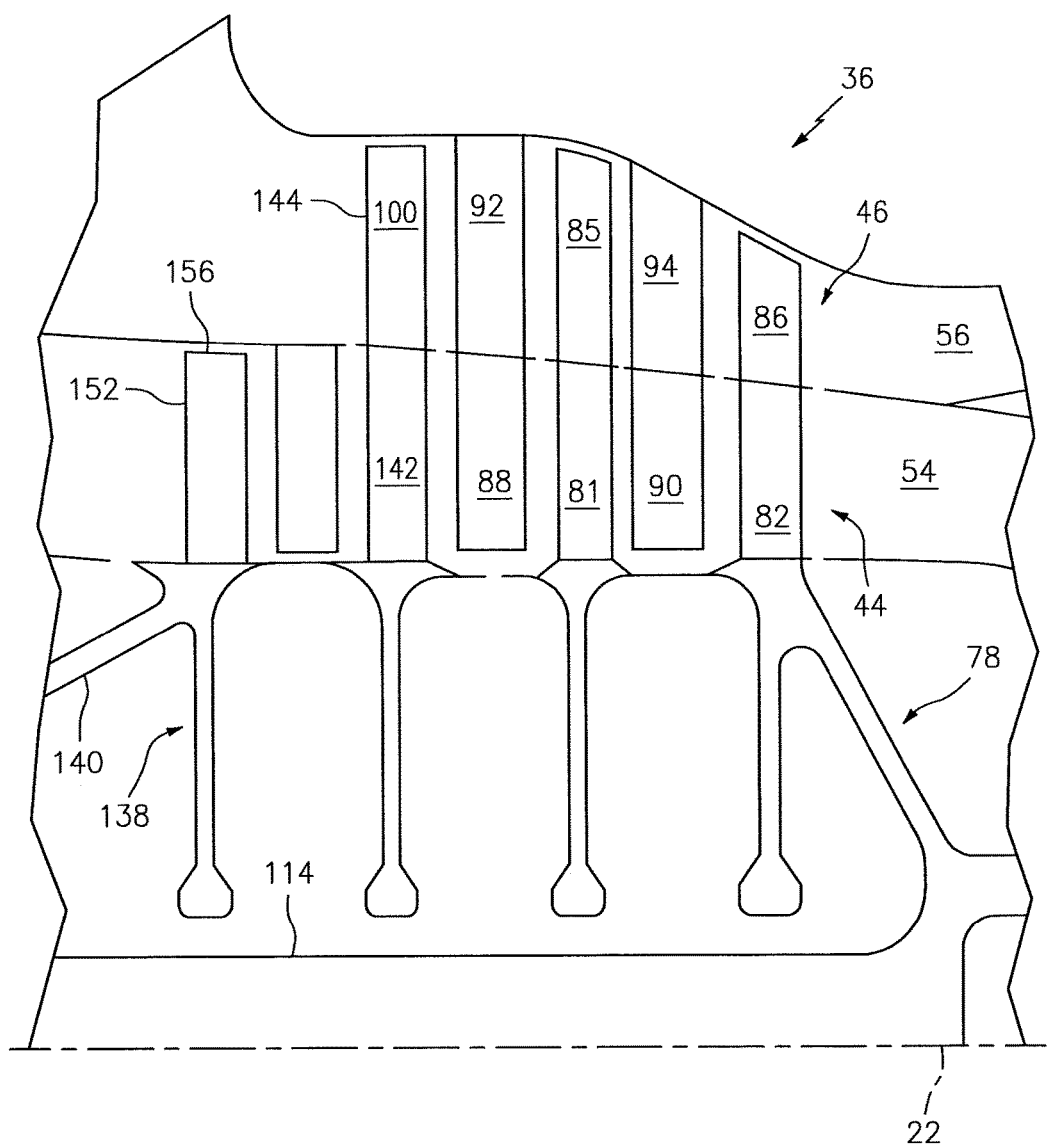
FIG. 11 is a partial, schematic sectional illustration of an alternate example pair of turbo-compressors.
Figure 12:
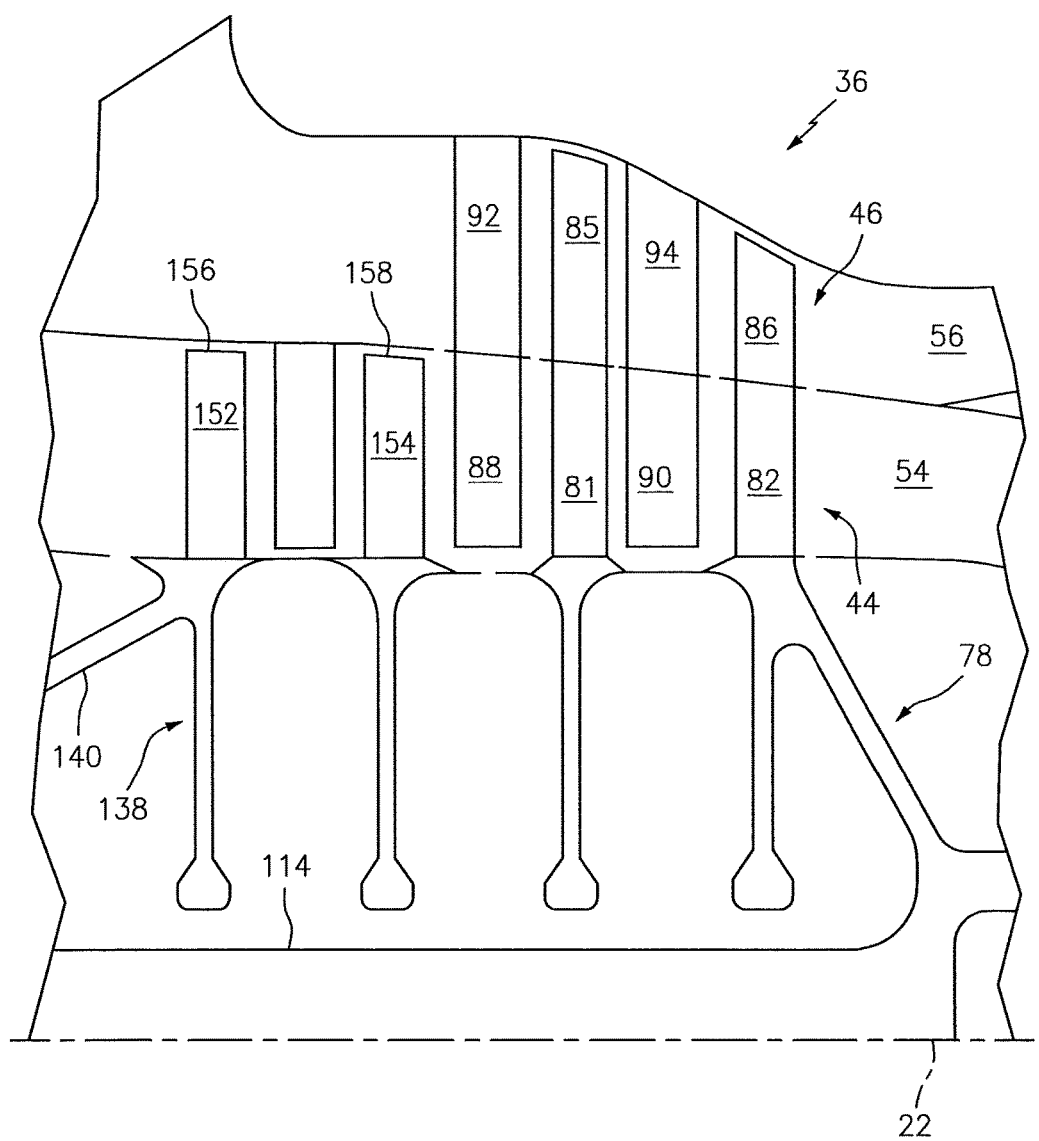
FIG. 12 is a partial, schematic sectional illustration of alternate example compressor section upstream of a turbo-compressor.

Referring to FIGS. 10-12, in some embodiments, the rotor 138 may include at least one set of compressor blades 152, 154 that respectively extend to distal blade tips 156, 158. This set of compressor blades 152 may be the only set of blades configured with the rotor 138 as illustrated in FIG. 10. In such an embodiment, the rotor 138 is configured as a compressor rotor. Alternatively, the compressor blades 152 may be configured in addition to another set of compressor blades 142, 154 as illustrated in FIG. 11 or 12. The rotor 138 of the present disclosure, of course, may have various configurations other than those described above and illustrated in the drawings. For example, in other embodiments, a discrete compressor stage may be arranged between a pair of compressor/turbine stages. In addition, the rotor 78 paired with the rotor 138 may have various configurations other than that described above and illustrated in the drawings.

Figure 13A:
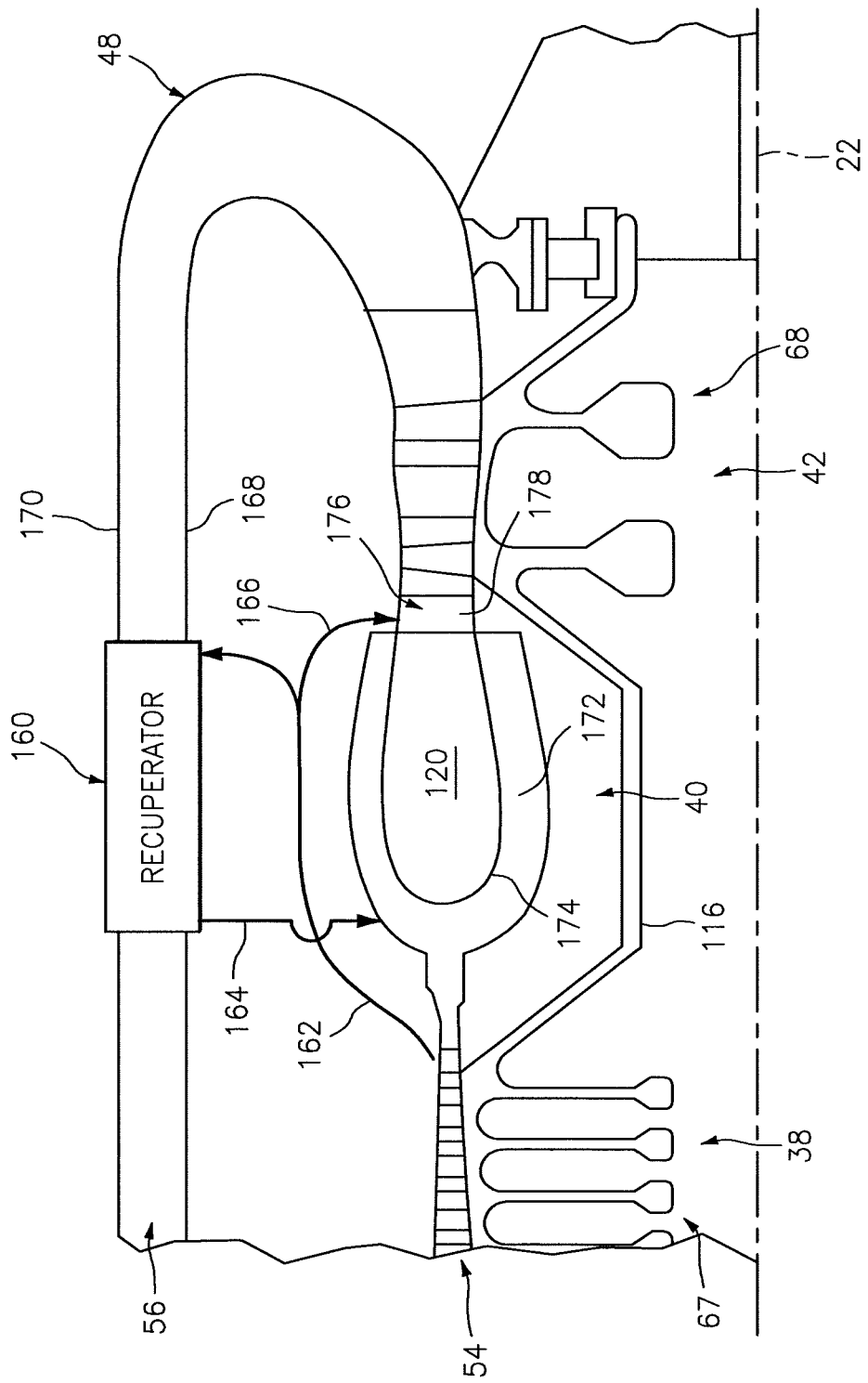
FIG. 13A is a partial, schematic sectional illustration of an example of a turbine engine core configured with at least one recuperator.

Referring to FIG. 13A, in some embodiments, the turbine engine 20 may include a recuperator 160, a recuperator inlet duct 162 and a recuperator outlet duct 164. The turbine engine 20 may also include a recuperator bypass duct 166.

The recuperator 160 is fluidly coupled between the inlet duct 162 and the outlet duct 164. The recuperator 160 is configured with the core flow path 48 downstream of the combustor section 40. The recuperator 160 of FIG. 13A, for example, is arranged within the reverse flow section 56 between the high pressure turbine section 42 and the low pressure turbine section 46. With such an arrangement, the recuperator 160 may be wholly within the core flow path 48, extend partially into the core flow path 48, or extend through the core flow path 48. The recuperator 160 may also or alternatively be formed integral with inner and/or outer walls 168 and 170 of the core flow path 48.

The recuperator 160 is configured to recuperate and utilize thermal energy carried by the combustion products (post combustion core air) to heat compressed core air received through the inlet duct 162. The recuperator 160, for example, may include at least one heat exchanger. This heat exchanger may be configured as a crossflow heat exchanger. The heat exchanger may alternatively be configured as a parallel flow heat exchanger or a counter flow heat exchanger. Where the recuperator 160 includes more than one heat exchanger, some or all of these heat exchangers may be fluidly coupled in parallel between the inlet duct 162 and the outlet duct 164. Some or all of the heat exchangers may also or alternatively be fluidly coupled in serial between the inlet duct 162 and the outlet duct 164.

The inlet duct 162 to the recuperator 160 is fluidly coupled with the core flow path 48 upstream of a plenum 172 which surrounds or is otherwise adjacent a combustor 174 in the combustor section 40. The inlet duct 162 of FIG. 13A, for example, is fluidly coupled to and receives compressed core air from a portion of the forward flow section 54 at (e.g., on, adjacent or proximate) a downstream end of the high pressure compressor section 38.

The outlet duct 164 from the recuperator 160 is fluidly coupled with the combustor section 40. The outlet duct 164 of FIG. 13A, for example, is fluidly coupled to and provides the heated compressed core air to the plenum 172. This heated compressed core air mixes with the main flow core air within the plenum 172 and thereby preheats the core air entering the combustor 174. By preheating the compressed core air prior to combustion, less fuel may be required for the combustion process while still elevating the combustion products to an elevated temperature. This in turn may increase turbine engine 20 efficiency and thereby reduce cost of turbine engine 20 operation.

The bypass duct 166 branches off from the inlet duct 162 and is fluidly coupled with at least one other component of the turbine engine 20. In this manner, the bypass duct 166 may redirect a portion of the compressed core air for cooling the turbine engine component. The bypass duct 166 of FIG. 13A, for example, is fluidly coupled to and provides a portion of the compressed core air for cooling a stator vane arrangement 176 located at a downstream end of the combustor 174. This stator vane arrangement 176 includes one or more combustor exit guide vanes 178, which may be included as part of the combustor section 40 or the high pressure turbine section 42. Of course, the bypass duct 166 may also or alternatively route compressed core air to other turbine engine components included in one or more other engine sections or elsewhere within the turbine engine 20.

Figure 13B:
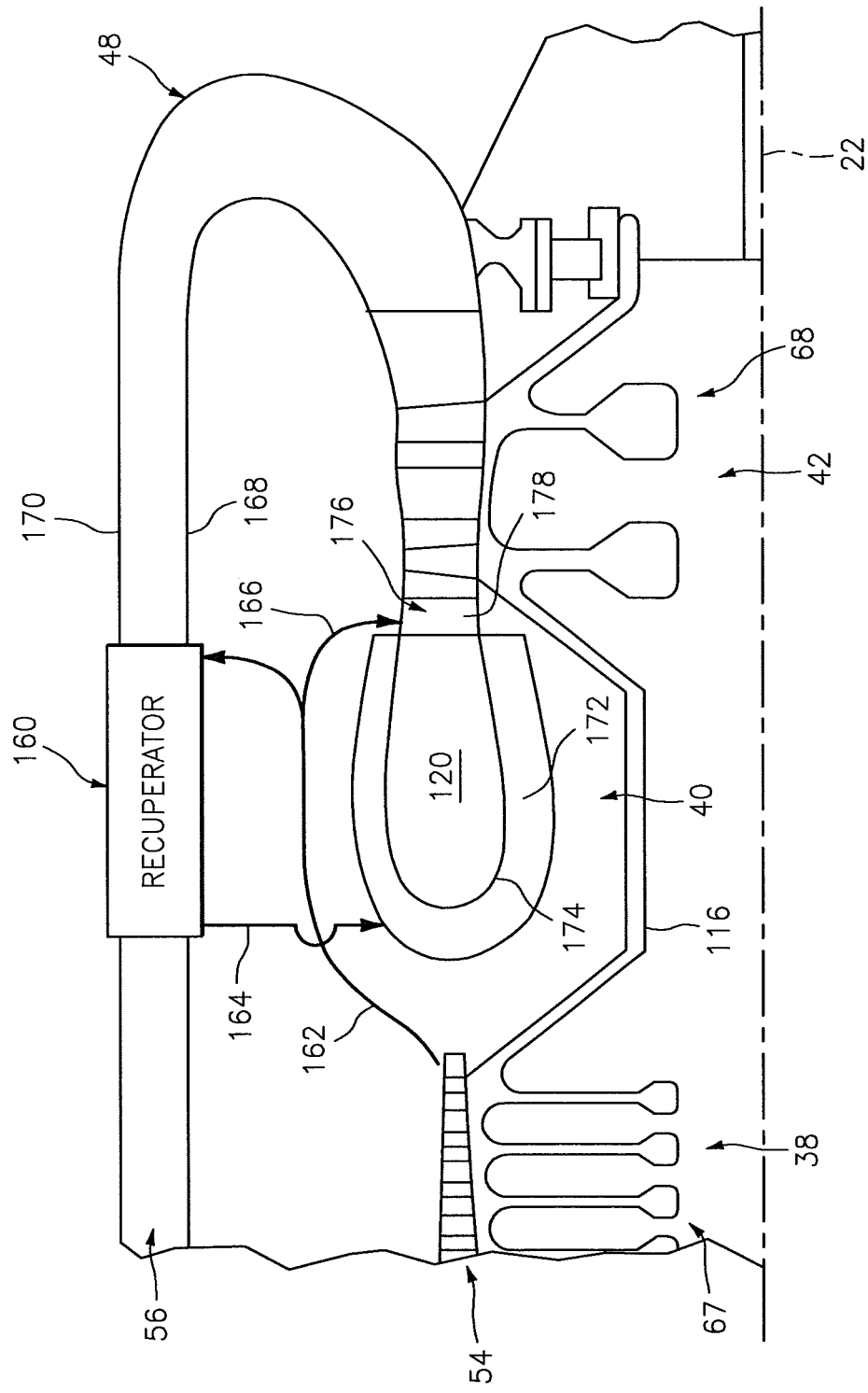
FIG. 13B is a partial, schematic sectional illustration of another example of a turbine engine core configured with at least one recuperator.

Referring to FIG. 13B, in some embodiments, the recuperator 160 (or recuperators) may fluidly couple the HPC section 38 to the combustor section 40. Thus, the inlet duct 162 and/or the outlet duct 164 may be fluidly coupled in-line with and may be configured as part of the forward flow section 54. In contrast, referring to FIG. 13A, a diffuser 163 also fluidly couples the HPC section 38 with the combustor section 40. Thus, a partial quantity of the core air is diverted from the forward flow section 54 and directed through the recuperator(s) 160 for treatment.

Figure 14:
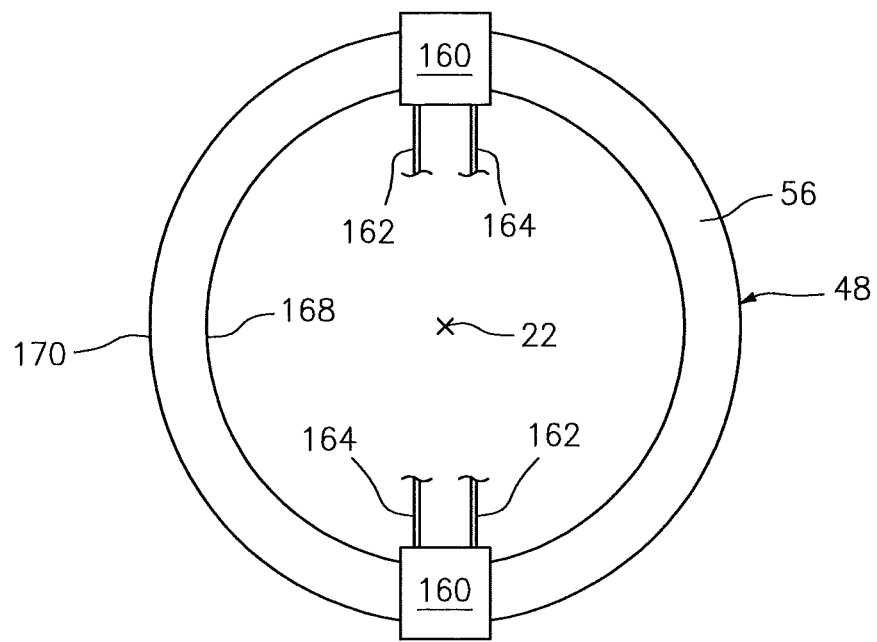
FIG. 14 is a schematic cross-sectional illustration of an example of a core flow path configured with a plurality of recuperators.
Figure 15:
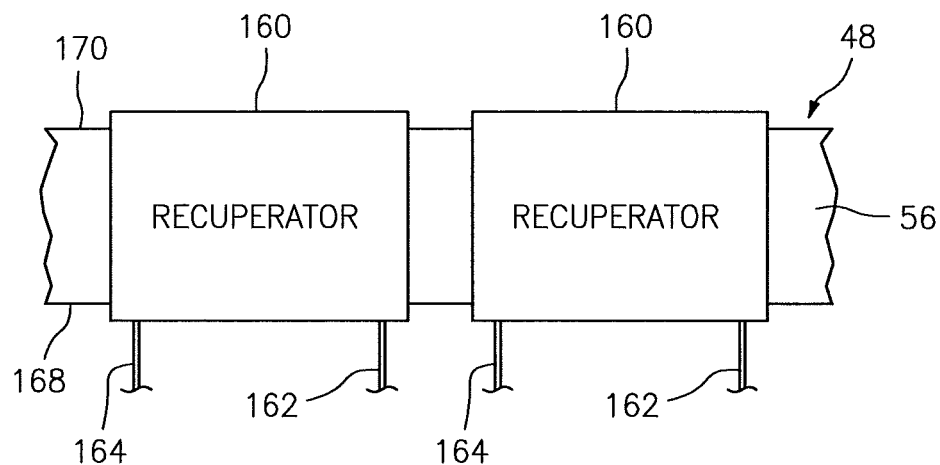
FIG. 15 is a partial, schematic sectional illustration of an example of a core flow path configured with a plurality of recuperators.

Referring to FIGS. 14 and 15, in some embodiments, the turbine engine 20 may include one or more additional recuperators 160. Each of these recuperators 160 may have a similar configuration to the recuperator 160 described above. The recuperators 160 may be disposed circumferentially about the centerline 22 (see FIG. 14). One or more of the recuperators 160 may also or alternatively be disposed longitudinally along the core flow path 48 (see FIG. 15); e.g., where one recuperator 160 is upstream of another one of the recuperators 160. Each of the recuperators 160 may be discretely configured and coupled between a dedicated inlet duct 162 and outlet duct 164. Alternatively, one or more of the recuperators 160 may be configured in parallel and/or serial between a common inlet duct 162 and/or a common outlet duct 164.

In some embodiments, fan blades 180 may be configured as fixed blades and fixedly connected to the fan rotor 66 as illustrated in FIG. 1. In some embodiments, the fan blades 180 may be configured as variable pitch blades and pivotally connected to a hub of the fan rotor 66 as illustrated in FIG. 9. With this configuration, a pitch of each fan blade 180 may be changed using an actuation system 182 within the hub of the fan rotor 66. The actuation system 182 may be configured for limited variable pitch. Alternatively, the actuation system 182 may be configured for full variable pitch where, for example, fan blade 180 pitch may be completely reversed. Various actuations systems for pivoting fan blades are known in the art and the present disclosure is not limited to any particular types or configurations thereof.

In some embodiments, one or more seals may be included to reduce or prevent leakage around the tips of one or more of the rotor blades and/or stator vanes described above. Such seals may include abradable blade outer air seals (BOAS) for the rotor blades and knife edge seals for the stator vanes. The present disclosure, of course, is not limited to the foregoing exemplary sealing arrangements.

The terms "forward", "aft", "inner" and "outer" are used to orientate the components described above relative to the turbine engine 20 and its centerline 22. One or more of these components, however, may be utilized in other orientations than those described above. The present invention therefore is not limited to any particular turbine engine component spatial orientations.

The above described components may be included in various turbine engines other than the one described above. The turbine engine component, for example, may be included in a geared turbine engine where a gear train connects one or more shafts to one or more rotors in a fan section, a compressor section and/or any other engine section. Alternatively, the turbine engine component may be included in a turbine engine configured without a gear train. The turbine engine component may be included in a geared or non-geared turbine engine configured with a single spool, with two spools, or with more than two spools. The turbine engine may be configured as a turbofan engine, a turbojet engine, a propfan engine, a pusher fan engine or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A turbine engine, comprising:
    a first rotor including a first set of compressor blades;
    a second rotor adjacent the first rotor, the second rotor including a second set of compressor blades and a set of turbine blades, arranged radially outboard of the second set of compressor blades, wherein each turbine blade in the set of turbine blades is connected to a respective compressor blade in the second set of compressor blades; and
    a combustor section configured to receive air compressed by the first and the second sets of compressor blades and provide combustion products to the set of turbine blades.

2. The turbine engine of claim 1, wherein the first rotor further includes a second set of turbine blades respectively connected to the first set of compressor blades.

3. The turbine engine of claim 2, wherein the second set of turbine blades are downstream of the set of turbine blades.

4. The turbine engine of claim 1, wherein the first set of compressor blades respectively extend to blade tips.

5. The turbine engine of claim 1, further comprising a set of shrouds respectively positioned radially between and connected to the second set of compressor blades and the set of turbine blades.

6. The turbine engine of claim 1, wherein the first rotor further includes a third set of compressor blades between the first set of compressor blades and the second set of compressor blades.

7. The turbine engine of claim 6, wherein the third set of compressor blades respectively extend to blade tips.

8. The turbine engine of claim 6, wherein the first rotor further includes a second set of turbine blades downstream of the set of turbine blades and respectively connected to the third set of compressor blades.

9. The turbine engine of claim 1, wherein the second rotor further includes a third set of compressor blades.

10. The turbine engine of claim 9, wherein the third set of compressor blades respectively extend to blade tips.

11. The turbine engine of claim 9, wherein the second rotor further includes a second set of turbine blades respectively connected to the third set of compressor blades.

12. The turbine engine of claim 1, further comprising a third rotor between the second set of compressor blades and the combustor section, wherein the third rotor includes a third set of compressor blades.

13. The turbine engine of claim 1, further comprising a third rotor between the combustor section and the set of turbine blades, wherein the third rotor includes a second set of turbine blades.

14. The turbine engine of claim 1, further comprising a fan section upstream of the first rotor.

15. The turbine engine of claim 14, wherein a rotor of the fan section is connected to the first rotor.

16. The turbine engine of claim 14, wherein a rotor of the fan section is connected to the second rotor.

17. The turbine engine of claim 14, wherein a rotor of the fan section is connected to the first rotor and/or the second rotor through a gear train.

18. A turbine engine, comprising:
a first compressor section;
a turbo-compressor including a rotor disk, a second compressor section and a turbine section, the second compressor section comprising a set of compressor blades arranged circumferentially about the rotor disk, and the turbine section comprising a set of turbine blades arranged circumferentially about the set of compressor blades, wherein the second compressor section is downstream of the first compressor section; and
a combustor section fluidly coupled between the second compressor section and the turbine section.

19. The turbine engine of claim 18, wherein the first compressor section includes a first rotor and the second compressor section comprises a second rotor which is discrete from the first rotor.

20. The turbine engine of claim 18, wherein
the first compressor section includes a first set of compressor blades which respectively extend to blades tips;
the second compressor section includes a second set of compressor blades; and
the turbine section includes a set of turbine blades radially outboard of and respectively connected to the second set of compressor blades.

* * * * *